United States Patent
Temple et al.

(10) Patent No.: US 6,861,393 B2
(45) Date of Patent: *Mar. 1, 2005

(54) METHOD FOR REDUCING SAG IN DRILLING, COMPLETION AND WORKOVER FLUIDS

(75) Inventors: Colin Temple, Scotland (GB); Andrew Forbes Paterson, Scotland (GB); Christopher Duncan Leith, Scotland (GB)

(73) Assignee: Halliburton Energy Services, Inc., Duncan, OK (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/175,256

(22) Filed: Jun. 19, 2002

(65) Prior Publication Data

US 2004/0002426 A1 Jan. 1, 2004

(51) Int. Cl.⁷ .................................................. C09K 7/06
(52) U.S. Cl. ..................................... 507/119; 507/925
(58) Field of Search ................................. 507/119, 925

(56) References Cited

U.S. PATENT DOCUMENTS

| | | | |
|---|---|---|---|
| 4,657,943 A | * | 4/1987 | Wietsma ..................... 523/216 |
| 4,670,501 A | * | 6/1987 | Dymond et al. ............. 524/458 |
| 5,487,425 A | | 1/1996 | Ohno et al. |
| 5,869,434 A | * | 2/1999 | Mueller et al. .............. 507/110 |
| 6,204,224 B1 | | 3/2001 | Quintero et al. |
| 6,586,372 B1 | | 7/2003 | Bradbury et al. ........... 507/140 |
| 2004/0002426 A1 | | 1/2004 | Temple et al. .............. 507/100 |

FOREIGN PATENT DOCUMENTS

| | | | |
|---|---|---|---|
| EP | 1 111 024 A | 6/2001 | |
| GB | 2 342 671 A | 4/2000 | ............ C09K/7/06 |

OTHER PUBLICATIONS

Foreign communication from a related counterpart apppliciation dated Sep. 1, 2004.

Zamora M. et al, " Controlling Barite Sag Can Reduce Drilling Problems", Oil and Gas Journal, Pennwell Publishing Co., Tulsa, Oklahoma, USA, vol. 92, no. 7, Feb. 14, 1994, pp. 47–48, 50–52, entire document.

* cited by examiner

Primary Examiner—Philip C. Tucker
(74) Attorney, Agent, or Firm—Craig W. Roddy; Karen B. Tripp

(57) ABSTRACT

A method is disclosed for reducing sag in drilling and completion fluids and in workover fluids. The method employs a drilling fluid comprising a low molecular weight polyalkyl methacrylate with an average molecular weight ranging from about 40,000 to about 90,000. This additive does not result in increased viscosity of the fluid.

18 Claims, No Drawings

METHOD FOR REDUCING SAG IN DRILLING, COMPLETION AND WORKOVER FLUIDS

BACKGROUND OF THE INVENTION

1. Field of the Invention

The present invention relates to methods and compositions for reducing the sag of a weight material in a drilling fluid for drilling operations such as drilling, running casing, and cementing and in fluids for workover operations.

2. Description of Relevant Art

A drilling fluid, or "mud" which a drilling fluid is also often called, is a specially designed fluid that is circulated in a wellbore or borehole as the wellbore is being drilled in a subterranean formation to facilitate the drilling operation. As used herein, the term "drilling operation" shall mean drilling, running casing and/or cementing unless indicated otherwise. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

A drilling fluid typically comprises water and/or oil or synthetic oil or other synthetic material or synthetic fluid as a base fluid, with solids in suspension. A non-aqueous based drilling fluid typically contains oil or synthetic fluid as a continuous phase and may also contain water dispersed in the continuous phase by emulsification so that there is no distinct layer of water in the fluid. Such dispersed water in oil is generally referred to as an invert emulsion or water-in-oil emulsion.

A number of additives may be included in such drilling fluids and invert emulsions to enhance certain properties of the fluid. Such additives may include, for example, emulsifiers, weighting agents, fluid-loss control agents, viscosifiers or viscosity control agents, and alkali. Weighting agents are commonly added to increase the density of the fluid. Barite or barytes (barium sulphate) are typical weighting agents, although other minerals are also common.

Viscosifiers are typically added to increase the viscosity of the fluid to facilitate or enhance suspension of weighting agents in the fluid. Organoclays, such as for example bentonites hectorites and other swelling clays, chemically treated to enhance their oil wettability, are typical viscosifiers. Organic polymers and long chain fatty acids may also be added to increase viscosity and aid weighting agent suspension.

Generally, increased viscosity leads to improved suspension of weighting agents which in turn limits or reduces problematic "sag." However, excessive viscosity can have adverse effects on equivalent circulating density (causing it to increase), which can also lead to problems, particularly in wells where the differences in subterranean formation pore pressures and fracture gradients are small, as commonly encountered in deep water wells.

Under certain well conditions, including without limitation, well geometries, temperatures and pressures, a phenomenon called "barite sag" or "sag" can occur. "Sag" is generally a "significant" variation in mud density (>0.5 lbm/gal) along the mud column, which is the result of settling of the weighting agent or weight material and other solids in the drilling fluid. Sag generally results from the inability of the drilling fluid under the particular well conditions to provide adequate suspension properties.

Suspensions of solids in non-vertical columns are known to settle faster than suspensions in vertical ones. This effect is driven by gravity and impeded by fluid rheology, particularly non-Newtonian and time dependent rheology. Manifestation of this effect in a drilling fluid is also known as "sag," although sag occurs in both vertical and non-vertical wells.

Drilling fluids in deviated wellbores can exhibit sag in both static and dynamic situations. In this context, static is a totally quiescent fluid state, such as when drilling has ceased; dynamic is any situation where the fluid is exposed to a shear stress, such as for example during drilling. As used hereinafter, the term "sag" shall be understood to include both static and dynamic sag unless specifically indicated otherwise.

Sag can result in formation of a bed of the weighting agents on the low side of the wellbore, and stuck pipe, among other things. In some cases, sag can be very problematic to the drilling operation and in extreme cases may cause hole abandonment. As directional drilling and deviated wellbores become more common if not the norm in the oil and gas industry, more and improved methods are needed to reduce or eliminate sag, without adding viscosity problems.

SUMMARY OF THE INVENTION

The present invention provides a method for reducing sag or the settlement of weighting agents in an oil based or invert emulsion drilling fluid without significantly increasing the viscosity of the drilling fluid. The method comprises adding a low molecular weight polyalkyl methacrylate to the drilling fluid. No copolymer such as vinyl pyrrolidone or its equivalent is needed or used. The invention also provides a drilling fluid comprising the additive. As used herein, the term "drilling fluid" shall be understood to include fluids used in drilling, cementing, casing, workover and/or other similar downhole operations.

DETAILED DESCRIPTION OF PREFERRED EMBODIMENTS

In the present invention, an oil or invert emulsion based drilling fluid comprising a low molecular weight polyalkyl methacrylate additive is used in drilling operations or workover operations. The fluid provides good suspension of weighting agents without excessive viscosity and shows a reduced rate of sag when compared to prior art fluids.

The effective average molecular weight range of the polyalkyl methacrylate is about 40,000 to about 90,000. A polyalkyl methacrylate within this weight range is commercially available under the tradename VISCOPLEX® 1-304, available from ROHMAX or Rohm GmbH of Germany. Preferred concentrations of this additive in the drilling fluid are in the range of about 0.5 ppb to about 3 ppb. At these concentrations, this additive of the present invention does not significantly increase the viscosity of the drilling fluid when measured at either about 120 degrees Fahrenheit and ambient pressure or at temperatures up to about 400 degrees Fahrenheit and 20,000 psig pressure.

Sag factors achieved using this low molecular weight polyalky methacrylate additive range from about 0.50 to about 0.51. Typical prior art drilling fluids presently in use in the oil and gas industry exhibit sag factors ranging from about 0.51 to about 0.55, where a sag factor of 0.50 indicates no settlement of weighting agent (i.e., no sag). Copolymers with the polyalkyl methacrylate are not needed in the present invention.

U.S. Pat. No. 6,204,224, issued Mar. 20, 2001 to Quintero et al. previously reported use of a copolymer of a high molecular weight polyalkyl methacrylate and vinyl pyrrolidone for rheological modification and filtration control for oil or invert emulsion based, and particularly ester and synthetic based, drilling fluids. These copolymers are said to be capable of building a viscoelastic rheological structure which serves to prevent or reduce barite sag and provide cuttings transport. The patent includes data comparing the copolymer of high molecular weight polyalkyl methacrylate and vinyl pyrrolidone with a copolymer of low molecular weight polyalkyl methacrylate and vinyl pyrrolidone which indicates that the latter yielded poor results in contrast to the claimed high molecular weight polyalkyl methacrylate and vinyl pyrrolidone copolymer. The data in the patent followed traditional expectations that the more viscous fluid would provide the better suspension properties and be less likely to sag. Addition of the high molecular weight polyalkyl methacrylate and vinyl pyrrolidone copolymer to the drilling fluid significantly increased the viscosity of the fluid, which resulted in the drilling fluid being a highly viscous fluid.

Notwithstanding the teaching of U.S. Pat. No. 6,204,224 to Quintero, et al., the present invention departs from traditional thinking and unexpectedly provides a formulation that yields superior results in reducing sag without added viscosity and thus without consequent problems that highly viscous fluids can cause. The advantages of the present invention are demonstrated by the test data below.

Experiments

Initially, samples of field drilling mud were either static aged or hot rolled at 400 degrees Fahrenheit to evaluate the mud at 50 degrees Fahrenheit higher than the mud was originally engineered to withstand. The mud generally held up well, although the difference between the top and bottom density results were excessive. To improve barite (weighting agent) suspension, two different products were added to samples (one product per sample) for comparison in concentrations of 1.0 lb/bb. These two products were hydrogenated castor oil and VISCOPLEX® 1-304. Data from this experiment is shown in Table 1 below.

TABLE 1

| Field Mud Sample | bbl | 1.0 | 1.0 | 1.0 |
|---|---|---|---|---|
| Hydrogenated Castor Oil | lb | — | 1.0 | — |
| VISCOPLEX ®1-304 | lb | — | — | 1.0 |
| Static Aged @ 400° F. | hour | 16 | 16 | 16 |
| Plastic Viscosity | cP | 58 | 75 | 80 | 74 |
| Yield Point | lb/100 ft² | 22 | 29 | 23 | 27 |
| 10 second Gel | lb/100 ft² | 14 | 24 | 20 | 24 |
| 10 minute Gel | lb/100 ft² | 19 | 40 | 38 | 37 |
| Fann 35 dial readings @ 120° F. | | | | | |
| Θ 600 | | 138 | 179 | 183 | 175 |
| Θ 300 | | 80 | 104 | 103 | 101 |
| Θ 200 | | 60 | 77 | 76 | 74 |
| Θ 100 | | 38 | 48 | 46 | 48 |
| Θ 6 | | 13 | 16 | 14 | 16 |
| Θ 3 | | 10 | 14 | 12 | 14 |
| Weight | lb/gal | 18.0 | 18.0 | 18.0 |
| Top Oil Separation | % | 3.0 | 3.0 | 2.5 |
| Gelled/Settling | y/n | y/n | y/n | y/n |
| Top Stratification | sg | 1.87 | 2.05 | 2.10 |
| Middle Stratification | sg | 2.10 | 2.21 | 2.17 |
| Bottom Stratification | sg | 2.29 | 2.32 | 2.22 |

The concentration of each additive—the hydrogenated castor oil and the VISCOPLEX® 1-304—was increased in additional samples of field mud to 2.0 lb/bbl. As the data in Table 2 indicates, this addition had the desired effect of reducing settlement (e.g., sag) during static aging without adverse effects on (i.e., without increasing) either viscosity or fluid loss. Of these two additives, the better results were seen with VISCOPLEX® 1-304 and so the remaining studies were conducted only with VISCOPLEX® 1-304.

TABLE 2

| Field Mud Sample | bbl | 1.0 | 1.0 | 1.0 |
|---|---|---|---|---|
| Hydrogenated Castor Wax | lb | — | 2.0 | — |
| VISCOPLEX ®1-304 | lb | — | — | 2.0 |
| Static Aged @ 400° F. | hour | 16 | 16 | 16 |
| Plastic Viscosity | cP | 54 | 60 | 75 | 62 |
| Yield Point | lb/100 ft² | 22 | 27 | 35 | 28 |
| 10 second Gel | lb/100 ft² | 13 | 17 | 21 | 20 |
| 10 minute Gel | lb/100 ft² | 18 | 42 | 49 | 44 |
| Electrical Stability | volt | — | 654 | 776 | 878 |
| HTHP Fluid Loss @ 400° F. | ml/30 min | — | — | 2.2 | 2.0 |
| Fann 35 dial readings @ 120° F. | | | | | |
| Θ 600 | | 130 | 147 | 185 | 152 |
| Θ 300 | | 76 | 87 | 110 | 90 |
| Θ 200 | | 57 | 65 | 83 | 69 |
| Θ 100 | | 36 | 42 | 53 | 46 |
| Θ 6 | | 12 | 14 | 17 | 17 |
| Θ 3 | | 10 | 12 | 15 | 14 |
| Weight | lb/gal | 18.0 | 18.0 | 18.0 |
| Top Oil Separation | % | 2.5 | 2.5 | 1.5 |
| Gelled/Settling | y/n | y/n | y/n | y/n |
| Top Stratification | sg | 1.94 | 2.01 | 2.12 |
| Middle Stratification | sg | 2.12 | 2.16 | 2.19 |
| Bottom Stratification | sg | 2.29 | 2.29 | 2.24 |

Laboratory samples of a drilling mud approximately like the field mud were prepared. Different concentrations of VISCOPLEX® 1-304 were added to the samples—1.0 lb/bbl concentration in one sample and 2.0 lb/bbl concentration in another sample. These samples were static aged at 400 degrees Fahrenheit for 16 hours. The treated laboratory samples showed low density variations and minimal top oil separation, with the 2.0 lb/bbl concentration giving slightly better results. The data from this experiment is shown in Table 3 below. The products in the tables designated by tradenames EZ MUL® NT, INVERMUL® NT, DURATONE®, and SUSPENTONE™ are available from Halliburton Energy Services, Inc. in Houston, Tex., U.S.A. The product designated as BENTONE® 38 is available from Rheox. These products are common additives for completing a drilling fluid and comprise emulsifiers, rheological control additives, suspension agents and the like.

TABLE 3

| MUD SAMPLE COMPOSITION | | | | |
|---|---|---|---|---|
| Total DF 1 (invert emulsion base) | bbl | 0.393 | 0.393 | 0.393 |
| EZ MUL ® NT[1] | ppb | 15.0 | 15.0 | 15.0 |
| INVERMUL ® NT[2] | ppb | 3.0 | 3.0 | 3.0 |
| DURATONE ® HT[3] | ppb | 20.0 | 20.0 | 20.0 |
| Lime | ppb | 10.0 | 10.0 | 10.0 |
| BENTONE ® 38 | ppb | 2.0 | 2.0 | 2.0 |
| Water | bbl | 0.102 | 0.102 | 0.102 |
| CaCl$_2$ | ppb | 19.01 | 19.01 | 19.01 |
| SUS-PENTONE ™[4] | ppb | 2.0 | 2.0 | 2.0 |
| Barite | ppb | 559.93 | 559.9 | 559.93 |
| RM ™ 63[5] | ppb | 1.0 | 1.0 | 1.0 |

TABLE 3-continued

| | | | | | | |
|---|---|---|---|---|---|---|
| VISCOPLEX® 1-304 | ppb | | — | | 1.0 | 2.0 |
| Hot rolled @ 400° F. | hour | | 16 | | | |
| Static Aged @ 400° F. | hour | | | 16 | 16 | 16 |
| MUD SAMPLE PROPERTIES | | | | | | |
| Plastic Viscosity | cP | 65 | 62 | 60 | 62 | 61 |
| Yield Point | lb/100 ft² | 25 | 19 | 23 | 16 | 17 |
| 10 second Gel | lb/100 ft² | 15 | 12 | 15 | 10 | 14 |
| 10 minute Gel | lb/100 ft² | 26 | 31 | 20 | 30 | 32 |
| Fann 35 dial readings @ 120° F. | | | | | | |
| Θ 600 | | | 155 | 143 | 143 | 140 | 139 |
| Θ 300 | | | 90 | 81 | 83 | 78 | 78 |
| Θ 200 | | | 68 | 59 | 62 | 57 | 57 |
| Θ 100 | | | 44 | 36 | 38 | 34 | 35 |
| Θ 6 | | | 15 | 10 | 12 | 8 | 9 |
| Θ 3 | | | 13 | 9 | 10 | 7 | 7 |
| Weight | lb/gal | | | 18.0 | 18.0 | 18.0 |
| Top Oil Separation | % | | | 3.5 | 2.5 | 2.0 |
| Gelled/Settling | y/n | | | y/n | y/n | y/n |
| Top Stratification | sg | | | 2.11 | 2.16 | 2.15 |
| Middle Stratification | sg | | | 2.22 | 2.18 | 2.17 |
| Bottom Stratification | sg | | | 2.36 | 2.22 | 2.20 |

[1] Polyaminated fatty acid emulsifier.
[2] Blend of oxidized tall oil and polyaminated fatty acid emulsifier.
[3] Organophilic leonardite filtration control agent.
[4] Organophilic clay suspension agent.
[5] Blend of dimer and trimer fatty acids rheology modifier.

One sample of the laboratory mud without the VISCOPLEX® 1-304 additive and one sample of the laboratory mud with 2.0 lb/bbl VISCOPLEX® 1-304 were placed in hot roll cells and left static in an oven for 96 hours at 400 degrees Fahrenheit. Though there was top oil separation and settlement in both cells, the sample with the VISCOPLEX® 1-304 showed significantly better results, as can be seen in Table 4.

TABLE 4

| MUD SAMPLE COMPOSITION: | | | |
|---|---|---|---|
| Total DF 1 (invert emulsion base) | bbl | 0.393 | 0.393 |
| EZ MUL® NT | ppb | 15.0 | 15.0 |
| INVERMUL® NT | ppb | 3.0 | 3.0 |
| DURATONE® HT | ppb | 20.0 | 20.0 |
| Lime | ppb | 10.0 | 10.0 |
| BENTONE® 38 | ppb | 2.0 | 2.0 |
| Water | bbl | 0.102 | 0.102 |
| CaCl₂ | ppb | 19.01 | 19.01 |
| SUSPENTONE™ | ppb | 2.0 | 2.0 |
| Barite | ppb | 559.93 | 559.93 |
| RM 63™ | ppb | 1.0 | 1.0 |
| VISCOPLEX® 1-304 | ppb | — | 2.0 |
| Static Aged @ 400° F. | hour | 96 | 96 |
| MUD SAMPLE PROPERTIES | | | |
| Plastic Viscosity | cP | 60 | 63 | 65 |
| Yield Point | lb/100 ft² | 23 | 13 | 15 |
| 10 second Gel | lb/100 ft² | 15 | 13 | 15 |
| 10 minute Gel | lb/100 ft² | 20 | 32 | 35 |
| Electrical Stability | volt | — | 799 | 833 |
| Fann 35 dial readings @ 120° F. | | | | |
| Θ 600 | | 143 | 139 | 145 |
| Θ 300 | | 83 | 76 | 80 |
| Θ 200 | | 62 | 54 | 57 |
| Θ 100 | | 38 | 30 | 34 |
| Θ 6 | | 12 | 7 | 8 |

TABLE 4-continued

| | | | |
|---|---|---|---|
| Θ 3 | | 10 | 5 | 7 |
| Weight | lb/gal | | 18.0 | 18.0 |
| Top Oil Separation | % | | 20.0 | 15.0 |
| Gelled/Settling | y/n | | y/n | y/n |
| Top Stratification | sg | | 1.84 | 2.0 |
| Middle Stratification | sg | | 2.36 | 2.20 |
| Bottom Stratification | sg | | 2.70 | 2.50 |

A sample of the field mud sample without VISCOPLEX® 1-304 and a sample of the field mud sample with 2.0 lb/bbl VISCOPLEX® 1-304 were sheared on a Silverson mixer over a 60 minute period before being static aged at 400 degrees Fahrenheit for 16 hours. The results, shown in Table 5, indicated no significant difference between the two samples, which indicated that VISCOPLEX™ 1-304 can withstand shear.

TABLE 5

| Field Mud Sample | | | |
|---|---|---|---|
| Sheared for 1 hour | bbl | 1.0 | — |
| VISCOPLEX® 1-304 | ppb | — | 2.0 |
| Static Aged @ 400° F. | hour | 16 | 16 |
| Plastic Viscosity | cP | 70 | 70 |
| Yield Point | lb/100 ft² | 27 | 28 |
| 10 second Gel | lb/100 ft² | 22 | 26 |
| 10 minute Gel | lb/100 ft² | 39 | 41 |
| Electrical Stability | volt | 838 | 1013 |
| Fann 35 dial readings @ 120° F. | | | |
| Θ 600 | | 167 | 168 |
| Θ 300 | | 97 | 98 |
| Θ 200 | | 72 | 73 |
| Θ 100 | | 44 | 47 |
| Θ 6 | | 14 | 17 |
| Θ 3 | | 12 | 15 |
| Weight | lb/gal | 18.0 | 18.0 |
| Top Oil Separation | % | 3.5 | 2.5 |
| Gelled/Settling | y/n | y/n | y/n |
| Top Stratification | sg | 2.10 | 2.12 |
| Middle Stratification | sg | 2.18 | 2.14 |
| Bottom Stratification | sg | 2.22 | 2.17 |

Fann 70 rheological profiles were carried out on samples of both field mud without VISCOPLEX® 1-304 and field mud with 2.0 lb/bbl VISCOPLEX® 1-304. After the samples reached the maximum temperatures and pressures desired, the samples were left for 4.5 hours at these maximum temperatures and pressures before instrument readings were re-taken. In addition to the Fann 70, the viscosity of both samples was measured on a Fann 35 at minus 5 degrees Centigrade to simulate cold climates. These tests showed no detrimental effects from the addition of VISCOPLEX® 1-304. The test data is reported in Tables 6 and 7 below.

TABLE 6

FANN 70 RHEOLOGICAL PROFILE
Field Mud Sample

| | | | | | | |
|---|---|---|---|---|---|---|
| Temperature (° C.): | 50 | 100 | 150 | 204 | 204 | −5 |
| Pressure (psi): | 0 | 5000 | 11000 | 17500 | 17500 4.5 Hours | Fann 35 |
| 600 rpm | 132 | 107 | 102 | 118 | 103 | O/S |
| 300 rpm | 75 | 64 | 61 | 72 | 53 | O/S |
| 200 rpm | 57 | 50 | 48 | 55 | 37 | 249 |
| 100 rpm | 38 | 36 | 34 | 37 | 21 | 148 |

TABLE 6-continued

FANN 70 RHEOLOGICAL PROFILE
Field Mud Sample

| | | | | | | | |
|---|---|---|---|---|---|---|---|
| 60 rpm | | 28 | 28 | 27 | 28 | 16 | — |
| 30 rpm | | 22 | 22 | 22 | 22 | 10 | — |
| 6 | | 13 | 15 | 15 | 13 | 5 | 35 |
| 3 | | 11 | 13 | 13 | 10 | 3 | 29 |
| Plastic Viscosity, | cp | 57 | 43 | 41 | 46 | 50 | — |
| Yield Point, | lb/100 ft² | 18 | 21 | 20 | 26 | 3 | — |
| Gel, 10 sec. | lb/100 ft | 12 | 13 | 13 | 10 | 3 | 37 |
| Gel, 10 min. | lb/100 ft | 15 | 16 | 15 | 13 | 6 | 61 |

TABLE 7

FANN 70 RHEOLOGICAL PROFILE
Field Mud Sample + 2 lb/bbl VISCOPLEX ® 1-304

| | | | | | | | |
|---|---|---|---|---|---|---|---|
| Temperature (° C.): | | 50 | 100 | 150 | 204 | 204 | −5 |
| Pressure (psi): | | 0 | 5000 | 11000 | 17500 | 17500 4.5 Hours | Fann 35 |
| 600 rpm | | 144 | 123 | 96 | 99 | 97 | O/S |
| 300 rpm | | 84 | 79 | 63 | 60 | 32 | O/S |
| 200 rpm | | 65 | 64 | 52 | 47 | 39 | 253 |
| 100 rpm | | 44 | 47 | 39 | 34 | 23 | 152 |
| 60 rpm | | 34 | 39 | 32 | 25 | 17 | — |
| 30 rpm | | 25 | 31 | 26 | 21 | 11 | — |
| 6 | | 16 | 22 | 19 | 14 | 6 | 36 |
| 3 | | 14 | 21 | 17 | 11 | 3 | 30 |
| Plastic Viscosity, | cp | 60 | 44 | 33 | 29 | 45 | — |
| Yield Point, | lb/100 ft² | 24 | 35 | 30 | 31 | 7 | — |
| Gel, 10 sec. | lb/100 ft | 14 | 21 | 17 | 11 | 3 | 37 |
| Gel, 10 min. | lb/100 ft | 16 | 23 | 19 | 14 | 6 | 63 |

Several apparatus and procedures are available for measuring sag. A typical example is stratification testing to determine or evaluate the "sag" performance of a drilling fluid, i.e., the fluid's tendency to "sag." The procedure used in stratification testing is as follows:

A sample of the fluid or formulation is sealed within a stainless steel cell and placed vertically in an oven maintained at the expected maximum temperature of the well. The cell is usually pressurized using nitrogen to prevent loss of volatiles from the fluid. After the test period, typically 16 hours, the cell is depressurized and the volume of "top" (i.e., separated) oil is measured and expressed as a percentage of the total fluid volume. After removal of the top oil, the density of the fluid is measured at three depths—top, middle, and bottom. A "sag factor" is calculated by dividing the bottom density by the sum of the top and bottom densities. A sag factor of 0.5 indicates no settlement of weighting agents.

Stratification data is reported for sag calculations in Tables 1–5 above. As previously noted, the sag factors for the fluid tested with VISCOPLEX® 1-304 ranged from about 0.50 to about 0.51, generally indicating that sag either did not occur or did not occur in an appreciable or significant amount.

The viscosity of drilling fluid is typically measured by use of concentric cylinder viscometers such as the Fann 35SA, available from Fann Instruments in Houston, Tex., U.S.A. The viscosity of fluids under downhole conditions, i.e., temperatures up to about 500 degrees Fahrenheit and pressures to 20,000 psig, is typically measured using an instrument such as the Fann 70, available from Fann Instruments in Houston, Tex., U.S.A. Viscosity data is reported in all of the tables above and comparison of the viscocities of the fluids with and without VISCOPLEX® 1-304 indicates that the addition of VISCOPLEX® 1-304 to the fluid did not appreciably or significantly alter the viscosity of the fluid.

These experiments indicate that a low molecular weight polyalkyl methacrylate may be added to oil or invert emulsion based drilling fluids to obtain improved suspension properties or reduced sag without altering the viscosity of the fluid. Further, this additive does not seem to significantly alter or increase the fluid loss experienced with use of the fluid and the additive provides a further benefit of improving the static age results seen with the fluid.

The foregoing description of the invention is intended to be a description of preferred embodiments. Various changes in the details of the described drilling fluid and method can be made without departing from the intended scope of this invention as defined by the appended claims.

What is claim is:

1. A method for reducing sag in an oil or invert emulsion based drilling fluid, said method comprising adding to said fluid a low molecular weight polyalkyl methacrylate in an amount that does not significantly increase the viscosity of said fluid.

2. The method of claim 1 wherein the polyalkyl methacrylate has an average molecular weight ranging from about 40,000 to about 90,000.

3. The method of claim 1 wherein said fluid has a sag factor in the range of about 0.50 to about 0.51.

4. The method of claim 3 wherein said sag factor is determined according to stratification testing.

5. The method of claim 1 wherein the viscosity of said fluid before and after said addition of polyalkyl methacrylate is substantially the same.

6. The method of claim 1 wherein said polyalkyl methacrylate is provided in said fluid in a concentration ranging from about 0.5 ppb to about 3 ppb.

7. The method of claim 1 wherein said drilling fluid is used in drilling or completion operations.

8. The method of claim 1 wherein said drilling fluid is used in workover operations.

9. A drilling fluid comprising an oil or invert emulsion base, weighting agents and a low molecular weight polyalkyl methacrylate in an amount that does not significantly increase the viscosity of said fluid.

10. The drilling fluid of claim 9 wherein said polyalkyl methacrylate has an average molecular weight ranging from about 40,000 to about 90,000.

11. The drilling fluid of claim 9 wherein said drilling fluid has a sag factor in the range of about 0.50 to about 0.51.

12. The drilling fluid of claim 9 wherein polyalkyl methacrylate is provided in said fluid in a concentration ranging from about 0.5 ppb to about 3 ppb.

13. The drilling fluid of claim 9 further comprising emulsifiers.

14. The drilling fluid of claim 13 further comprising at least one additive selected from the group consisting of rheological additives, fluid loss control additives, and suspension agents.

15. A method for improving the suspension properties of an oil or invert emulsion based drilling fluid without significantly increasing the viscosity of said fluid, said method comprising adding to said fluid an additive comprising a low molecular weight polyalky methacrylate.

16. The method of claim 15 wherein said polyalkyl methacrylate is provided in a concentration ranging from about 0.5 ppb to about 3 ppb.

17. The method of claim 15 wherein said polyalkyl methacrylate has an average molecular weight ranging from about 40,000 to about 90,000.

18. The method of claim 15 wherein said fluid is used in drilling operations, completion operations, or workover operations in a borehole penetrating a subterranean formation.

* * * * *